United States Patent [19]
Mathiak et al.

[11] Patent Number: 5,836,849
[45] Date of Patent: Nov. 17, 1998

[54] METHOD AND APPARATUS FOR TRANSMITTING TORQUE BY USING A CLUTCH OF AN AUTOMATIC PLANETARY TRANSMISSION AS A START CLUTCH IN A MOTOR VEHICLE

[75] Inventors: Detlef Mathiak, Munich; Rahim Pour, Garching, both of Germany

[73] Assignee: Bayerische Motoren Werke Aktiengesellschaft, Munich, Germany

[21] Appl. No.: 766,034

[22] Filed: Dec. 16, 1996

[30] Foreign Application Priority Data

Dec. 14, 1995 [DE] Germany ............. 195 46 707.8

[51] Int. Cl.[6] .................................................. B60K 17/00
[52] U.S. Cl. ........................... 475/269; 477/174; 192/352
[58] Field of Search ..................... 477/166, 168, 477/174, 175, 176, 143, 156; 475/269, 280; 192/352

[56] References Cited

U.S. PATENT DOCUMENTS

| | | |
|---|---|---|
| 3,319,491 | 5/1967 | Simpson ........................... 192/3.52 |
| 4,080,848 | 3/1978 | Smirl .................................. 475/280 |
| 4,405,944 | 9/1983 | Makabe . |
| 4,433,594 | 2/1984 | Smirl ............................. 475/206 X |
| 4,502,352 | 3/1985 | Svab . |
| 4,602,525 | 7/1986 | Wakiya et al. . |
| 4,662,494 | 5/1987 | Muller et al. . |
| 4,827,784 | 5/1989 | Moroto et al. . |
| 5,421,440 | 6/1995 | Kumagai ........................ 477/175 X |
| 5,679,099 | 10/1997 | Kato et al. ......................... 477/176 |
| 5,735,770 | 4/1998 | Omote et al. .......................... 477/5 |

FOREIGN PATENT DOCUMENTS

| | | |
|---|---|---|
| 16 30 298 | 6/1971 | Germany . |
| 41 36 142 | 5/1993 | Germany . |
| 43 09 901 | 9/1994 | Germany . |

*Primary Examiner*—Khoi Q. Ta
*Attorney, Agent, or Firm*—Evenson, McKeown, Edwards & Lenahan, P.L.L.C.

[57] ABSTRACT

A method and an apparatus for transmitting torque in a motor vehicle having an automatically-shifted transmission, which uses a friction clutch rather than a known hydrodynamic converter to transmit torque. An electronic control system controls the friction clutch automatically.

14 Claims, 2 Drawing Sheets

METHOD AND APPARATUS FOR TRANSMITTING TORQUE BY USING A CLUTCH OF AN AUTOMATIC PLANETARY TRANSMISSION AS A START CLUTCH IN A MOTOR VEHICLE

BACKGROUND AND SUMMARY OF THE INVENTION

This invention relates to a method and an apparatus for transmitting torque in a motor vehicle having an automatically-shifted transmission, and in particular, a motor vehicle having a planetary automatic transmission.

A known torque-transmitting arrangement for a motor vehicle with an automatic transmission consists of a driving engine, a hydrodynamic converter and an automatically shifted planetary transmission. For example, as shown in FIG. 1, a hydrodynamic converter 2 is arranged between a driving engine (not shown) and a planetary automatic transmission 1. During a start-up movement of the motor vehicle, the hydrodynamic converter 2 essentially functions as a starting clutch, transmitting torque from the driving engine to the planetary transmission 1. Further details of this known arrangement can be found, for example, in U.S. Pat. No. 4,450,944.

The torque generated by the driving engine is adapted by the converter as a starting clutch corresponding to the operating conditions for the drive of the motor vehicle and is supplied to an input shaft of the planetary transmission. In the transmission, a further rotational speed/torque adaptation takes place. The torque is then transmitted by a transmission output shaft by way of a drive shaft and a differential to the driven wheels of the motor vehicle. The hydrodynamic converter usually also has a converter bridging clutch by means of which, in the "quasi steady-state" operation of the driving engine after a start-up movement, the convertor function is rendered inoperative.

A hydrodynamic converter separates the driving engine from the transmission while the vehicle is at rest while the transmission is in a drive position; it increases the comfort by means of a soft start-up movement; it increases the torque during start-up movement and accelerating operations by enlarging the transmission spread; and it isolates the rotational vibrations of the driving engine. Furthermore, the shifting jolt is reduced during the automatic gear change and also in the case of error functions during the gear change.

In this case, a hydrodynamic converter has the disadvantage of a poorer efficiency which increases the gasoline consumption, mainly while driving when the converter bridging clutch is open. Despite the increase of the torque by means of the converter, during the start-up movement without any stalling, a portion of the engine torque is used up for accelerating the converter's own mass. The dynamics of the start-up movement therefore deteriorate. In the cold condition, the converter efficiency is very poor which may lead to start-up movement problems in connection with diesel turbo-engines which, then, for example, may no longer be able to drive up a steep incline such as a garage ramp. As a result of the converter, the transmission becomes heavier and longer.

Therefore, there is a need for a method and an apparatus for transmitting torque in a motor vehicle having an automatically-shifted transmission which avoids the above-mentioned disadvantages of the hydrodynamic converter in connection with a planetary automatic transmission.

These and other needs have been met according to the present invention by providing an apparatus for transmitting torque in a motor vehicle having an automatically-shifted planetary transmission, comprising a friction clutch arranged as a starting clutch to transmit and adapt a torque from an output shaft of a driving engine of the motor vehicle to the automatically-shifted planetary transmission.

According to a further aspect of the present invention, these and other needs have been met by providing a method for transmitting torque in a motor vehicle having an automatically-shifted planetary transmission, comprising the step of arranging a friction clutch as a starting clutch between an output shaft of a driving engine of the motor vehicle and the automatically-shifted planetary transmission to transmit and adapt a torque therebetween.

According to the present invention, an automatic transmission constructed as a planetary transmission is combined with a starting clutch constructed as a friction clutch for driving a vehicle. A hydrodynamic converter is not required.

This has the advantage that the dynamics of the start-up movement and particularly the cold start-up movement are improved. In addition, the fuel consumption is lowered, the weight of the transmission is reduced by approximately 20%, and the length of the transmission is reduced by approximately 15%. As a result, a considerable improvement of the engine-transmission structural support and therefore of the acoustics is achieved. Furthermore, vehicle crawling is prevented when at a standstill with the transmission in gear.

In a preferred embodiment of the invention, the torque transmission by way of the friction clutch is controlled by an automatic control device. The automatic control device allows the friction clutch to slip, i.e., to rotate relative to the connected shaft, in a regulated and controlled manner during a gear change in the transmission or at low rotational engine speeds, for example during a start-up movement from rest. By appropriately controlling the clutch slippage, it is possible to smoothly execute a gear change and perform start-up movements at low engine speeds without a hydrodynamic converter, and without causing any loss in comfort to vehicle occupants, or undue stress on vehicle drivetrain components. All described functions of the converter, with the exception of the increase of the torque during start-up movement and accelerating operations, are carried out by the introduction of an electronically regulated and controlled high-efficiency starting clutch, such as a wet disk clutch or a dry friction clutch. In this case, the starting clutch can be constructed as a single-disk clutch or as a multi-disk clutch. If desired, the torque can be increased during a start-up movement by providing a lower start-up gear or by lowering the rear axle transmission ratio. Control systems for friction clutches in motor vehicles are known, for example, from U.S. Pat. No. 5,069,319.

According to one advantageous embodiment of the invention, a friction clutch of the planetary transmission is used as the controlled starting clutch. This has the advantage that a clutch which already exists in the transmission can be used as a controlled starting clutch. Likewise, the slip, which may be required for the isolation of torsional vibrations and the cushioning of faulty shifting, can be taken over by the existing clutches in the transmission if these can be controlled.

These and other objects, features and advantages of the present invention will become more readily apparent from the following detailed description when taken in conjunction with the accompanying drawings.

DETAILED DESCRIPTION OF THE DRAWINGS

Figure 1:
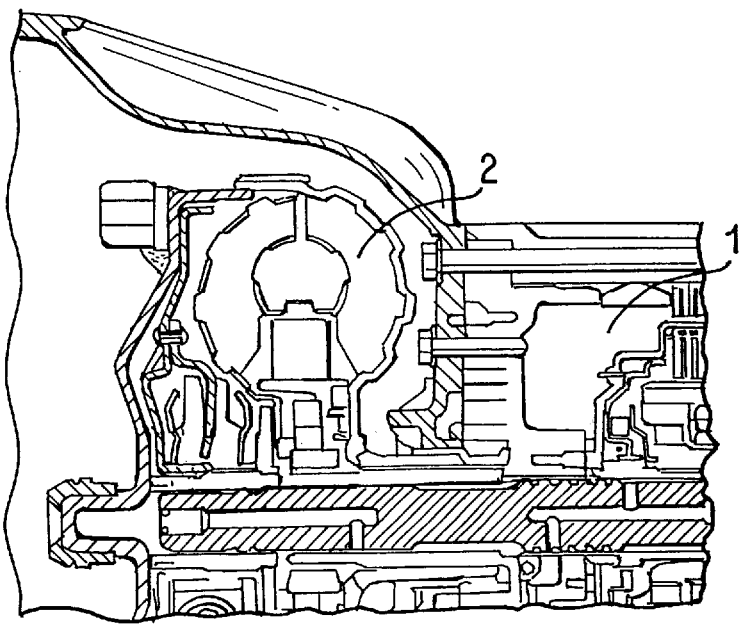
FIG. 1 is a sectional view of an automatically shifted planetary transmission with a hydrodynamic converter according to the prior art.
Figure 2:
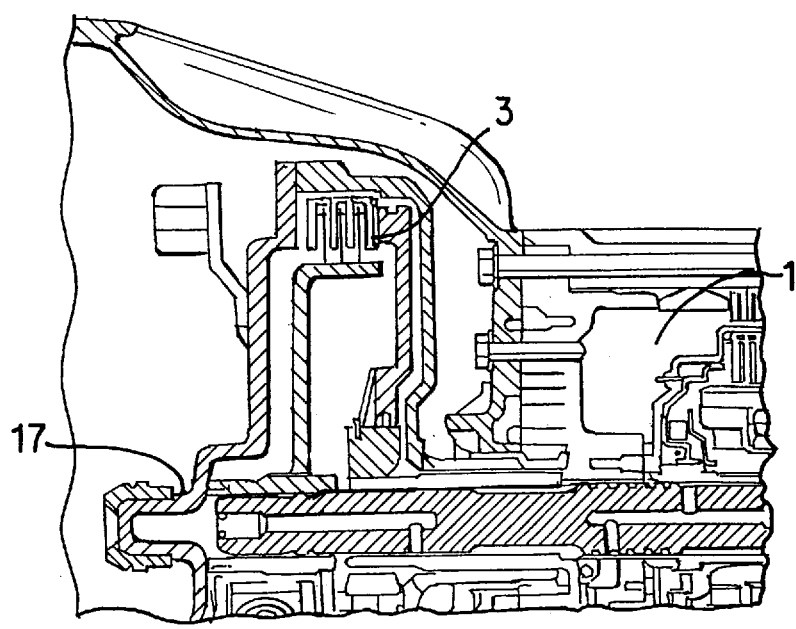
FIG. 2 is a sectional view of an apparatus for transmitting torque in a motor vehicle with an automatically shifted planetary transmission according to a preferred embodiment of the present invention.

Referring to FIG. 2, a friction clutch 3 is arranged as a starting clutch as the sole torque transmission device between an engine output shaft 17 of a motor vehicle engine and a known planetary automatic transmission 1. The friction clutch 3 is selectively engageable to form a connection between the engine output shaft 17 and the planetary automatic transmission 1. The friction clutch 3 is of a known multi-disk construction, and may be of either the wet or dry construction. Further details of such friction clutches are known to those of ordinary skill in the art and are not described in further detail here.

Figure 3:
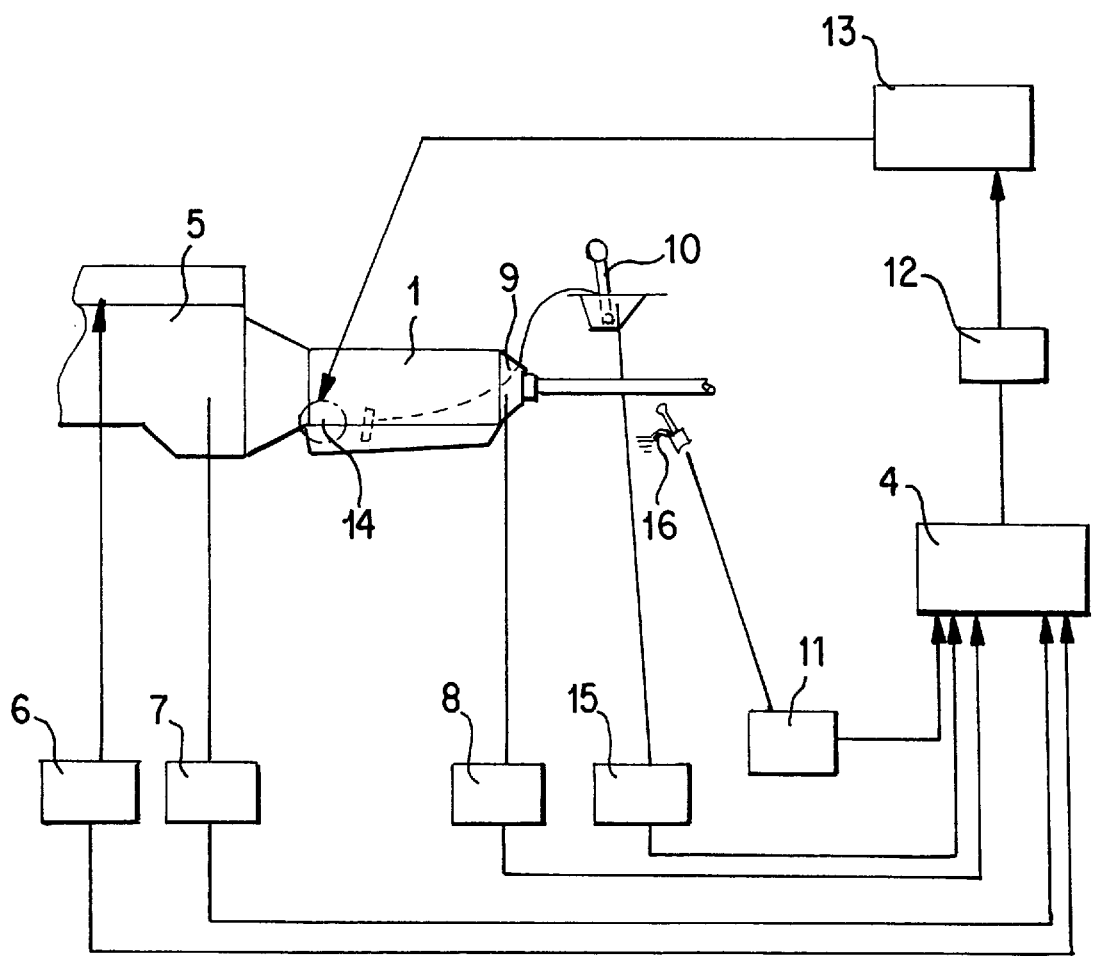
FIG. 3 is a diagrammatic view of an example of an electronic control system for controlling the torque transmitting apparatus shown in FIG. 2.

FIG. 3 schematically shows an example of a control diagram for the electronic control system for controlling the torque transmitting apparatus for a motor vehicle according to the present invention. An automatic control unit 4 of the electronic transmission control receives, among other input quantities, signals corresponding to (a) a load 6 of the driving engine 5, (b) a rotational speed 7 of the driving engine, (c) a rotational speed 8 of an output shaft 9 of the automatically shifted planetary transmission 1, (d) an engaged drive position 15 of a selector lever 10 for the automatically shifted planetary transmission, and (e) a signal 11 of a brake switch 16. From these input signals, which are used as control quantities for the automatic transmission, an output quantity 12 for a pulse-width-modulated valve 13 for the starting clutch control is obtained in the control unit 4 of the electronic transmission control. The position of the friction clutch 3 in the automatically shifted planetary transmission 1 is shown by the circle 14 indicated by a broken line in FIG. 3.

The pulse-width-modulated valve 13 is controlled by the control unit 4 to allow the friction clutch to slip, i.e., to rotate relative to the engine output shaft 17 by at least partially disengaging the clutch, in a regulated and controlled manner during a gear change in the transmission or at low rotational engine speeds, for example during a start-up movement of the vehicle from rest. By slipping the clutch in this manner, it is possible to smoothly execute a gear change and perform start-up movements at low engine speeds without a hydrodynamic converter, and without causing any loss in comfort to vehicle occupants, or undue stress on vehicle drivetrain components.

The control unit 4 advantageously may be included in an existing electronic transmission control unit or may be separate therefrom. The control unit 4 may include, or may be connected with, a general purpose processor programmed with instructions that cause the processor to perform the described steps, specific hardware components that contain hard-wired logic for performing the described steps, or any combination of programmed general purpose computer components and custom hardware components.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An apparatus for transmitting torque in a motor vehicle comprising an automatically-shifted planetary transmission, a friction clutch arranged as a starting clutch to transmit a torque from an output shaft of a driving engine of the motor vehicle to said automatically-shifted planetary transmission, wherein an existing friction clutch of the automatically-shifted planetary transmission is used as the starting clutch.

2. An apparatus according to claim 1, wherein said friction clutch is the sole torque transmission device between said output shaft and said automatically-shifted planetary transmission.

3. An apparatus according to claim 1, wherein the torque transmission by way of the friction clutch is controlled by an automatic control unit for the friction clutch.

4. An apparatus according to claim 3, wherein said automatic control unit controls the torque transmission as a function of at least one of: (a) a load of the driving engine, (b) a rotational speed of the driving engine, (c) a rotational speed of an output shaft of the automatically-shifted planetary transmission, (d) an engaged drive position of a selector lever for the automatically-shifted planetary transmission, and (e) a signal of a brake switch.

5. An apparatus according to claim 1, wherein said friction clutch is one of a dry friction clutch and a wet disk clutch.

6. An apparatus according to claim 3, wherein said friction clutch is one of a dry friction clutch and a wet disk clutch.

7. A method for transmitting torque in a motor vehicle having an automatically-shifted planetary transmission, comprising the step of arranging a friction clutch as a starting clutch between an output shaft of a driving engine of the motor vehicle and said automatically-shifted planetary transmission to transmit a torque therebetween, wherein an existing friction clutch of the automatically-shifted planetary transmission is used as the starting clutch.

8. A method according to claim 7, wherein said friction clutch is the sole torque transmission device arranged between said output shaft and said automatically-shifted planetary transmission.

9. A method according to claim 7, further comprising the step of automatically controlling the torque transmission by way of the friction clutch with an automatic control unit.

10. A method according to claim 9, wherein said automatic control unit controls the torque transmission as a function of at least one of: (a) a load of the driving engine, (b) a rotational speed of the driving engine, (c) a rotational speed of an output shaft of the automatically-shifted planetary transmission 1, (d) an engaged drive position of a selector lever for the automatically-shifted planetary transmission, and (e) a signal of a brake switch.

11. An apparatus for transmitting torque in a motor vehicle including an automatically-shifted planetary transmission, further comprising:

a friction clutch arranged as a starting clutch to transmit a torque from an output shaft of a driving engine of the motor vehicle to said automatically-shifted planetary transmission, said friction clutch being the sole torque transmission device between said output shaft and said automatically-shifted planetary transmission; and an automatic control unit which controls the torque transmission by way of the friction clutch, said automatic control unit controlling the torque transmission as a function of at least one of: (a) a load of the driving engine, (b) a rotational speed of the driving engine, (c) a rotational speed of an output shaft of the automatically-shifted planetary transmission, (d) an engaged drive position of a selector lever for the automatically-shifted planetary transmission, and (e) a signal of a brake switch.

12. An apparatus according to claim 11 wherein an existing friction clutch of the automatically-shifted planetary transmission is used as the starting clutch.

13. A method for transmitting torque in a motor vehicle having an automatically-shifted planetary transmission, comprising the steps of:

arranging a friction clutch as a starting clutch between an output shaft of a driving engine of the motor vehicle and said automatically-shifted planetary transmission to transmit a torque therebetween, said friction clutch being the sole torque transmission device arranged between said output shaft and said automatically-shifted planetary transmission; and automatically controlling the torque transmission by way of the friction clutch with an automatic control unit as a function of at least one of: (a) a load of the driving engine, (b) a rotational speed of the driving engine, (c) a rotational speed of an output shaft of the automatically-shifted planetary transmission 1, (d) an engaged drive position of a selector lever for the automatically-shifted planetary transmission, and (e) a signal of a brake switch.

14. A method according to claim 13, wherein an existing friction clutch of the automatically-shifted planetary transmission is used as the starting clutch.

* * * * *